(12) United States Patent
Bril et al.

(10) Patent No.: US 7,058,951 B2
(45) Date of Patent: Jun. 6, 2006

(54) METHOD AND A SYSTEM FOR ALLOCATION OF A BUDGET TO A TASK

(75) Inventors: Reinder Jaap Bril, Eindhoven (NL); Elisabeth Francisca Maria Steffens, Eindhoven (NL); Christian Hentschel, Eindhoven (NL); Maria Gabrani, Gattikon (CH); Cornelis Conradus Adrianus Maria Van Zon, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 585 days.

(21) Appl. No.: 10/169,346

(22) PCT Filed: Nov. 2, 2001

(86) PCT No.: PCT/EP01/12907

§ 371 (c)(1),
(2), (4) Date: Jul. 1, 2002

(87) PCT Pub. No.: WO02/37275

PCT Pub. Date: May 10, 2002

(65) Prior Publication Data

US 2003/0009506 A1 Jan. 9, 2003

(30) Foreign Application Priority Data

Nov. 6, 2000 (EP) .................................. 00203876

(51) Int. Cl.
*G06F 9/46* (2006.01)
(52) U.S. Cl. ...................... 718/104; 709/226; 710/242; 725/9; 725/148; 379/142.16; 379/221.09

(58) Field of Classification Search ........ 718/100–108; 709/226; 710/242; 725/9, 148; 379/142.16, 379/221.09; 370/341
See application file for complete search history.

(56) References Cited

U.S. PATENT DOCUMENTS

| 4,541,043 A | * | 9/1985 | Ballegeer et al. ........... 710/242 |
| 4,825,360 A | * | 4/1989 | Knight, Jr. ................... 718/106 |
| 5,161,154 A | * | 11/1992 | Diaz et al. ................... 370/341 |
| 5,179,702 A | * | 1/1993 | Spix et al. ................... 718/102 |
| 5,386,561 A | * | 1/1995 | Huynh et al. ................ 718/103 |

(Continued)

OTHER PUBLICATIONS

Kim et al., "Cell-Level Multiplex Scheduling To Support Multimedia Applications in Real-Time Channels", 1997, IEEE, pp. 48-54.*

(Continued)

*Primary Examiner*—Meng-Al T. An
*Assistant Examiner*—Jennifer N. To (57) ABSTRACT

In consumer devices, like digital television sets or set-top boxes, there can be a problem with a sudden load increase caused by for example a scene change and user focus. During such a load increase, the quality of service of the application having the user focus will decrease until the device detects the load increase. The device can reallocate resources to the application having the user focus after which the quality of service will increase again towards its previous level. However, the user may have noticed the quality decrease. In order to prevent this noticeable decrease of quality in overload situations, a method and a system are provided that guarantees a worst-case budget to the application having user focus and conditionally guarantees a budget surplus to an application not having the user focus. The latter application can then use that budget surplus to operate at a higher quality of service level.

11 Claims, 5 Drawing Sheets

U.S. PATENT DOCUMENTS

| | | | | |
|---|---|---|---|---|
| 5,448,735 | A | * | 9/1995 | Anderson et al. ............ 718/100 |
| 5,553,298 | A | * | 9/1996 | Merryman et al. .......... 718/104 |
| 5,574,778 | A | * | 11/1996 | Ely et al. ................ 379/221.09 |
| 5,603,029 | A | * | 2/1997 | Aman et al. ................. 718/105 |
| 5,678,170 | A | * | 10/1997 | Grube et al. .................... 725/9 |
| 5,696,815 | A | * | 12/1997 | Smyk ..................... 379/142.16 |
| 5,864,699 | A | * | 1/1999 | Merryman ................... 718/104 |
| 5,881,238 | A | * | 3/1999 | Aman et al. ................. 709/226 |
| 5,889,956 | A | * | 3/1999 | Hauser et al. .............. 709/226 |
| 5,953,044 | A | * | 9/1999 | Kato et al. .................. 725/148 |
| 6,003,061 | A | * | 12/1999 | Jones et al. .................. 718/104 |
| 6,167,425 | A | * | 12/2000 | Beckhoff .................... 718/103 |
| 6,385,638 | B1 | * | 5/2002 | Baker-Harvey ............. 718/107 |

OTHER PUBLICATIONS

Mehra et al., "Structuring Communication Software For Quality-Of-Service Guarantees", 1997, IEEE, pp. 616-634.*

Dynamic QOS Control Based on the QOS-Ticket Model (IEEE Proceedings of MULTIMEDIA '96, p. 78 to 85).

* cited by examiner

METHOD AND A SYSTEM FOR ALLOCATION OF A BUDGET TO A TASK

The invention relates to a method of scheduling a first task and a second task comprising the following steps:

a first step of determining that the first task is a more important task compared to the second task and that the second task is a less important task compared to the first task, a second step of requesting a more important requested budget by the more important task and requesting a less important requested budget by the less important task, a third step of allocating a more important guaranteed budget to the more important task based upon the more important requested budget of the more important task and allocating a less important guaranteed budget to the less important task based upon the less important requested budget of the less important task.

Furthermore, the invention relates to a system for scheduling a first task and a second task comprising:

determination means conceived to determine that the first task is a more important task compared to the second task and that the second task is a less important task compared to the first task, requesting means conceived to contain a more important request for a more important requested budget and a less important request for a less important budget, allocation means conceived to allocate a more important guaranteed budget to the more important task based upon the more important requested budget of the more important task and allocating a less important guaranteed budget to the less important task based upon the less important requested budget of the less important task.

Programmable components, rather than dedicated single-function components can perform continuous media processing. One of the characteristics of continuous media processing, such as is required for audio and video, is the presence of timing constraints. To handle such data appropriately, a system must observe the timing constraints and must guarantee sufficient system resources for processing. Since real time resources are finite, sufficient system resources may not be reserved for a particular processing session, which can lead to changes in a Quality of Service provided by the particular processing session.

An embodiment of the method and the system of the kind set forth above is known from Dynamic QOS Control Based on the QOS-Ticket Model (IEEE Proceedings of MULTI-MEDIA '96, Page 78 to 85). In order to control the Quality of Service, the known system provides a Quality of Service control architecture, which combines system resource reservation with adaptation by a processing session of the Quality of Service to this system resource reservation. Such a Quality of Service control architecture provides amongst others:

a QOS Factor, that is registered by each session to a QOS Manager and describes the characteristics, like a priority, of each session, a QOS-Ticket, which is issued by the QOS Manager to each session and represents a reservation of resources for a session, a QOS Manager, which is a kind of scheduler that allocates resources to sessions and issues a QOS-Ticket to each session containing the resource reservation for the session. When the number of sessions or some QOS Factor is changed, the QOS Manager recalculates the resource allocation, modifies the resource reservation of the QOS-Ticket, and notifies each session of the change, an operating system which provides a resource reservation mechanism and offers resource use information, a continuous media session that requests an amount of resources from the QOS Manager via the QOS Factor and adjusts its Quality of Service to meet the resource restriction specified in the QOS Ticket as issued by the QOS Manager.

With this architecture each session that requests an amount of resources from the QOS Manager competes for the limited amount of resources available. This can result in a new resource allocation to each of the already registered sessions, which on their turn may have to adjust their Quality of Service to meet their new resource allocation. But not all sessions might use their complete requested resource allocation. This is for example the case when a session requests, and gets allocated, an amount of resources it maximally needs to be able to provide the same Quality of Service during a possible load increase. When the load increase does not occur, the session will not use this amount of resources.

It is an object of the current invention to provide a method as set forth above that reallocates not used resources in an improved way. To achieve this object, the method according to the invention is characterized in that the third step comprises sub-steps of:

allocating a guaranteed budget margin for the more important task in addition to the more important guaranteed budget of the more important task, reserving a conditionally guaranteed budget margin to the less important task in addition to the less important guaranteed budget of the less important task. Within these sub-steps the more important guaranteed budget expresses the resource allocation that the more important task or session may use during a more important normal load situation. The guaranteed budget margin expresses the resource allocation that the more important task or session may use additionally during a more important possible load increase. The more important task may use its complete budget: the guaranteed budget margin in addition to the more important guaranteed budget. The less important guaranteed budget expresses the resource allocation that the less important task or session may use during the more important possible load increase. The conditionally guaranteed budget margin expresses an additional resource allocation to the less important task that can be used by the less important task for example when the more important task does not need its guaranteed budget margin. With these steps, a not used amount of resources allocated to the more important task can be reallocated to a, predetermined, less important task, without the more important task having to adjust its Quality of Service level in case of a possible load increase. With these steps all allocated resources can be used.

An embodiment of the method according to the invention is described in claim 2. When tasks request a budget from a scheduler, the scheduler can first perform an acceptance test. This test ensures that a total of the guaranteed budgets does not exceed the total amount of available budget. By deriving the conditionally guaranteed budget margin from the guaranteed budget margin, there may be no need for a separate acceptance test for this conditionally guaranteed budget margin, because the guaranteed budget margin may already have passed the acceptance test.

An embodiment of the method according to the invention is described in claim 3. The more important task can have the user focus. The user can therefore note a possible change in a quality of service of this more important task. A possible change in the quality of service can occur when the more important guaranteed budget is insufficient to maintain the quality of service level at a load increase. In order to prevent that the user notices the change in the quality of service, the allocated guaranteed budget margin in addition to the more important guaranteed budget can be sufficient for the more important task to operate at a more or less stable quality of service level. The more important requested budget can be substantially equal to the sum of the more important guaranteed budget and the guaranteed budget margin. By signaling its completion, a not used amount of budget of the more important task can be determined and can possibly be reallocated to a less important, predetermined, task.

An embodiment of the method according to the invention is described in claim 4. The less important task may operate at a first, possible lower, quality of service level when its less important guaranteed budget is allocated to it. When a user requests a less important task, for example a picture in picture screen in a television screen, and there is not enough budget available to provide the less important task with the less important requested budget, the scheduling method can allocate a smaller amount of budget to the less important task. The less important task can then operate at this first quality of service level in accordance to its allocated less important guaranteed budget. However, when the less important task gets allocated an additional conditionally guaranteed budget margin, which can be used by the less important task as described above, the less important task can operate at a second, higher, quality of service level which can lead to for example an improved image representation within the picture in picture screen. The less important requested budget can be substantially equal to the sum of the less important guaranteed budget and the conditionally guaranteed budget.

An embodiment of the method according to the invention is described in claim 5. When the more important task does not use its complete allocated more important guaranteed budget, this not used budget can be reallocated to the less important task. The complete not used budget can be reallocated or a part of the not used budget can be reallocated. When a part of the not used budget is reallocated, the part can be large enough for the less important task to operate at a different quality of service level.

A further object of the invention is to provide in a system as set forth above that reallocates not used resources in an improved way. To achieve this object, the system according to the invention is characterized in that the allocation means comprises:

guaranteeing means conceived to allocate a guaranteed budget margin for the more important task in addition to the more important guaranteed budget of the more important task, reservation means conceived to reserve a conditionally guaranteed budget margin to the less important task in addition to the less important guaranteed budget of the less important task.

Embodiments of the system according to the invention are described in claims 6 to 10.

The invention will be described by means of embodiments shown by the following drawings.

Figure 1:
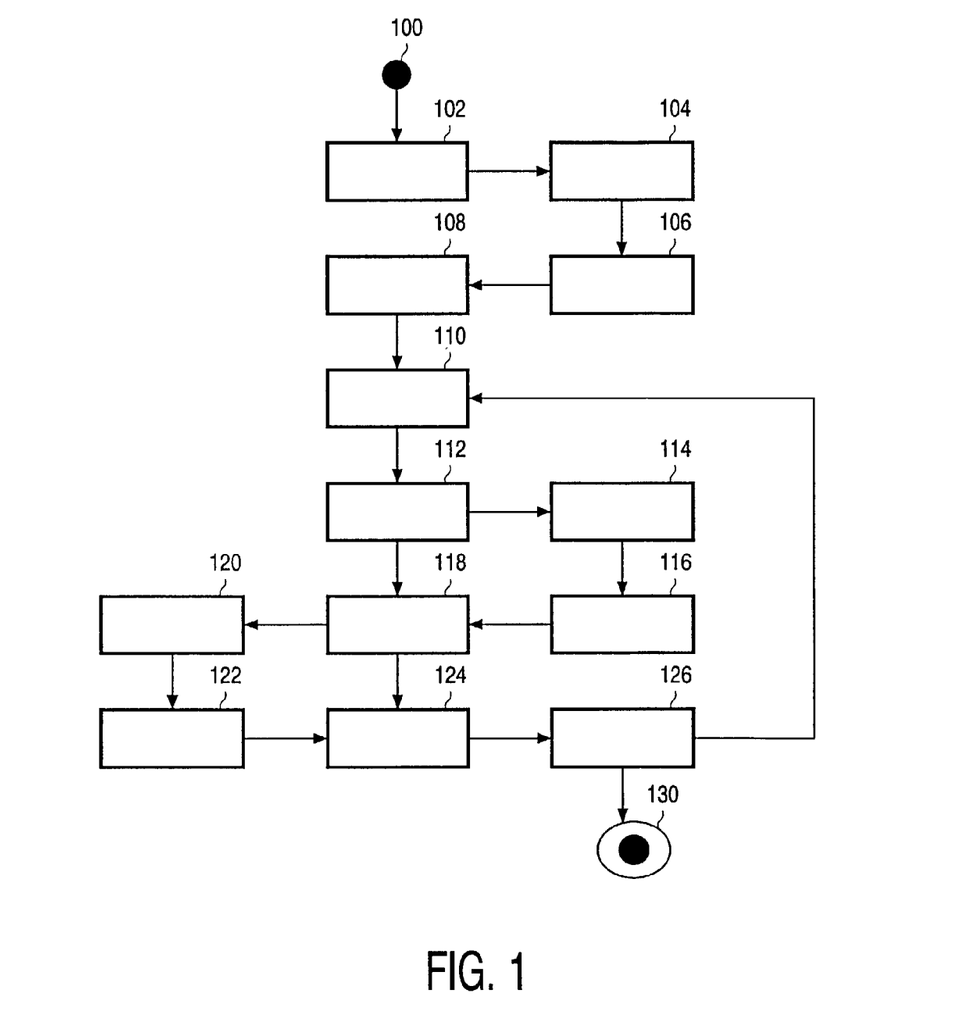
FIG. 1 illustrates an embodiment of the main steps of the method according to the invention that can reallocate a not used amount of a more important budget margin of a more important task to a less important task.

FIG. 1 illustrates an embodiment of the main steps of the method according to the invention that can reallocate a not used amount of a more important budget margin of a more important task to a less important task. For high-quality video systems, periodic budgets with period T are allocated to tasks for which each period can be the same. These periodic budgets with period T are allocated for a longer period of time, i.e. for a predefined number of periods. Scheduling of these tasks can be done as described in the main steps below. Here, step 100 is an initialization step during which the number of periods T that the budgets are going to be allocated is determined by a scheduler. In the next step, 102, the relative importance is determined of all tasks that can be scheduled. When, for example, a task has a user focus it is assigned a higher importance than a task that does not have the user focus. A task that has user focus, say UF, is for example a normal television program shown as main screen, while a task that does not have user focus, say ¬UF, can be a picture in picture screen within that television program. Both tasks can compete for the total amount of available budget. In step 104, the more important task with user focus requests a more important requested budget, say $B_{UF}$, and less important task request a less important requested budget, say $B_{\neg UF}$. A scheduler can admit the tasks when the sum of their periodic budgets is less then or equal to the total amount of available budget during each period T. When there are additional tasks, say 1 to N, each having its own budget, say $B_1$ to $B_N$, it can hold that the sum of all budgets is less then or equal to the total amount of available budget during the period T:

$$\left(\sum_{j=1}^{N} B_j\right) + B_{\neg UF} + B_{UF} \leq T.$$

Figure 2:
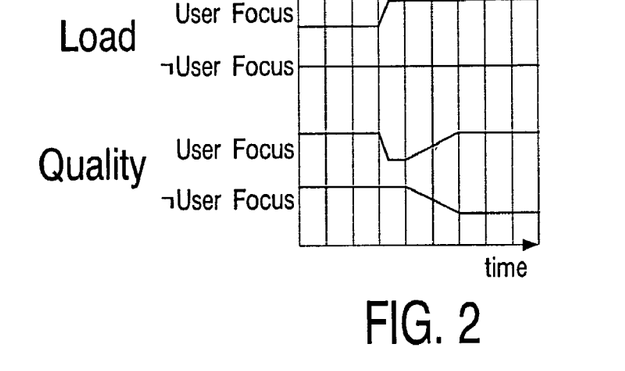
FIG. 2 illustrates a not desired quality of service change as a result of a load increase for the more important task.

This can be called an acceptance test: the budgets granted to the different tasks can be guaranteed to be available for the tasks. A task can get allocated a budget that is less than requested and, during a normal load situation, this allocated and guaranteed budget can be enough to provide a high quality of service level. However, it may not be enough to provide that high quality of service level during a sudden increase of the load caused by for example a scene change, as is illustrated in FIG. 2. In this figure it is shown, that during an increase of the load of the task having user focus, UF, the quality of service of that task can degrade. After a certain reaction time, which may last several periods, that is needed to detect the increase of the load, the quality of service of UF will increase again at the cost of the quality of service of the task that does not have the user focus: ¬UF. The quality of service of ¬UF can degrade because its budget can be decreased. For the task having user focus, this is not the desired situation, because a user will notice the temporal decrease of quality of service.

Figure 8:
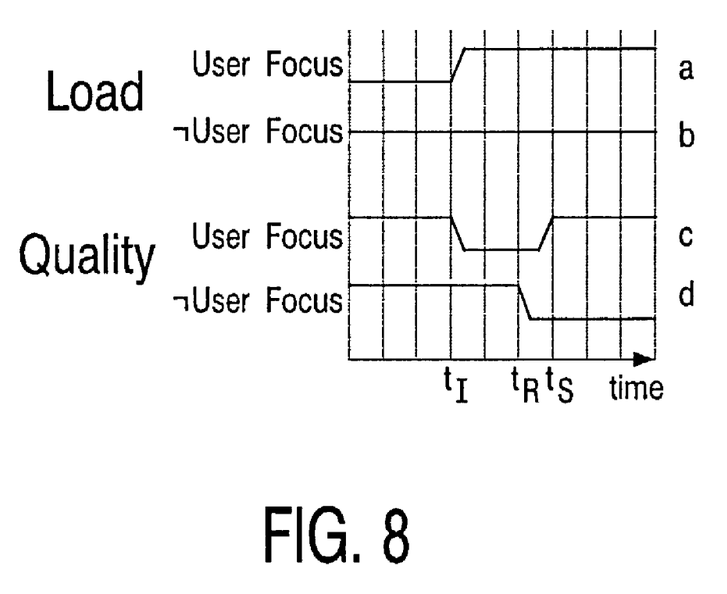
FIG. 8 illustrates an other not desired quality of service change as a result of a load increase for the more important task.

An other change of load and quality is illustrated in FIG. 8. FIG. 8 illustrates the user focus problem by showing the load induced by the input data and the perceived output quality of both applications as a function of time. When a sudden increase of the induced load of UF occurs (at time $t_I$), UF faces a structural overload situation. The scheduler detects the structural overload. If the scheduler cannot accommodate the structural overload by adapting budgets, it signals the problem to the quality manager. Subsequently, the quality manager determines the new optimal quality levels at which UF and ¬UF will run. It is assumed that the quality level of UF remains the same. Thus, after a certain reaction time (from $t_I$ to $t_R$), the quality and the budget of ¬UF are reduced, in this order, and, subsequently, the budget of UF is increased. At time $t_s$, a new equilibrium is reached. In the mean time (from $t_I$ to $t_s$), the perceived quality of UF's output is degraded, because UF's resource budget is temporarily insufficient to cope with the increased load, and UF has to get by on its budget, which necessarily results in some form of quality reduction at the output. Thus, the perceived quality at the output of UF is temporarily reduced, even though the quality level for UF remains the same. Even when the quality of service of a task can be set by some kind of quality manager, the quality of service during operation can also be determined by the allocated budget. A task having user focus can consist of one main window, because the user's focus can be on one thing at the time. A task not having user focus can consist of one or more secondary windows, for example a picture in picture window, videophone, or a web-browser. The quality level of tasks having user focus can be evaluated differently by a user than a quality level of tasks not having user focus.

Figure 3:
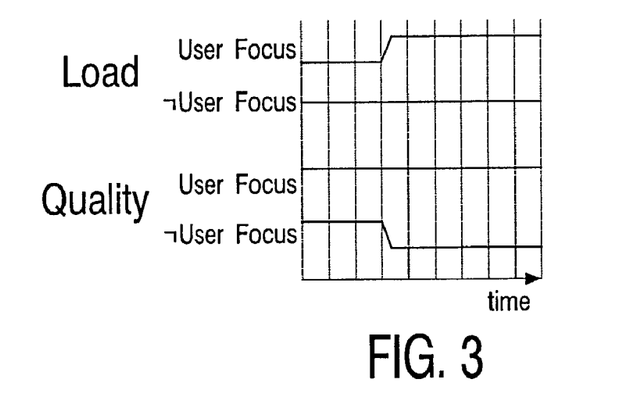
FIG. 3 illustrates a desired quality of service change as a result of a load increase for the more important task.
Figure 4:
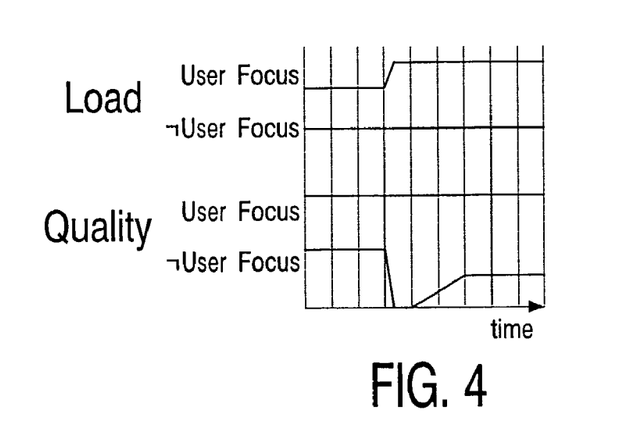
FIG. 4 illustrates an acceptable quality of service change as a result of a load increase for the more important task.

In order to prevent that it takes some reaction time to reallocate the needed budget, the less important task gets allocated a guaranteed less important budget that it can use during both the normal load and the load increase of the more important task. This is done in step 106, together with the allocation of a guaranteed more important budget to the more important task that it can use during its normal load. Next, in step 108, the more important task gets allocated a more important budget margin and in addition to its already allocated guaranteed more important budget it may be sufficient to maintain the same quality of service level during a possible worst-case load increase. This can lead to the desired situation as illustrated in FIG. 3. However, the situation as illustrated in FIG. 4 can also be feasible and can be acceptable by a user. In this case it can take some reaction time of the task not having user focus, ¬UF, to change its quality of service level into a lower quality during the load increase of the task having user focus UF. The quality of service level of ¬UF depends upon the budget used by UF.

All of these previous steps concern initialization and acceptance test. This can take quite some time, and is therefore not done for each individual period. The subsequent steps are however done for each period.

In step 110, which is performed at the beginning of each new period, the budgets of all tasks are "refreshed", by allowing each task to consume their allocated periodic budgets. This is the initialization step for each period. In the next step, 112, the more important task can operate using the sum of its more important guaranteed budget and the guaranteed budget margin. This sum enables the more important task to operate at a same quality of service level during both a normal load situation and a load increase situation.

When the more important task finishes operating during a period, it signals that it has completed its operation in step 114, by for example releasing its budget for that period. If it does not finish operating during the period after consuming both the more important guaranteed budget and the guaranteed budget margin, the scheduler will pre-empt the more important task. This can be done by forcing it to stop operating during this period. Pre-empting a task that has not finished operating at the end of a period, is a normal behavior for the scheduler. The task is then using a budget-overrun. It can be assumed that the total amount of allocated budget to the more important task is substantially equal to the more important requested budget $B_{UF}$. Let's rewrite this budget as $B_{UF}=B'_{UF}+\Delta B_{UF}$. The term $B'_{UF}$ represents the more important guaranteed budget and the term $\Delta B_{UF}$ represents the guaranteed budget margin. After completion of the more important task, eventual other tasks except for the less important task can operate during step 116 and signal their completion or are pre-empted during step 118. When all tasks have completed their operation or completely consumed their guaranteed budgets, including the guaranteed budget margin of UF, the conditionally guaranteed budget margin, $\Delta B_{UF}$, becomes completely, or partially, available to the less important task.

If the conditionally guaranteed budget becomes available structurally during a number of periods, the quality of service level of ¬UF can be increased in a controlled manner to a level corresponding with a budget substantially equal to the sum of the less important guaranteed budget and the conditionally guaranteed budget. This can prevent an unstable system. In step 120, the less important task can then operate at this higher quality of service level. Note that it is possible that there is no need for an additional acceptance test for this conditionally guaranteed budget margin. If the conditionally guaranteed budget does not become available structurally during a number of periods, the less important task can not operate at this higher quality of service level. It can then operate in step 120 at a lower quality of service level in accordance to its allocated less important guaranteed budget. The sequence of operation of the less important, more important and eventual other tasks is not fixed as described, but can for example also be on a round-robin basis. After signaling completion, in step 122, by the less important task for example by releasing its budget or by getting pre-empted because of budget-overrun, it is possible that there is still not used budget available. When the available budget during the period T, is not used completely by the scheduled tasks, all tasks that are scheduled during the period T, can consume the remainder of the total amount of budget during this period during step 124. When the period is completed, the end step of this period, 126, is reached after which the initial step, 110, of the next period can be entered again or the final step 130 can be entered.

If the conditionally guaranteed budget becomes available structurally during a number of periods, the quality of service level of ¬UF can be increased in a controlled manner to a level corresponding with a budget substantially equal to the sum of the less important guaranteed budget and the conditionally guaranteed budget. This can prevent an unstable system. Note that it is possible that there is no need for an additional acceptance test for this conditionally guaranteed budget margin.

Whenever a load change can be detected, for example by examining the size of B-frames, particular fields of frames containing complexity information or any other means, a method can contain steps to anticipate the forthcoming quality reduction. The method can comprise of a step to increase of the budget of a more important task in order to keep its quality constant and a step to decrease the budget of the less important task and hence the quality level of the less important task. Without semantic knowledge about the cause of a change in load, like for example a change from movie towards camera, it will in general take some lead-time to detect whether a load change is structural or incidental or the system may become unstable. This lead-time may be too long to allow the scheduling method to react fast enough, causing a temporal decrease in the quality of service of a more important task, that can be noticed by a user. With the method according to the invention, it is not necessary to need semantic knowledge to prevent a temporal, or structural, decrease in the quality of service of a more important task that can have the user focus.

The order in the described embodiment of the method of the current invention is not mandatory, a person skilled in the art may change the order of steps or perform steps concurrently using threading models, multi-processor systems or multiple processes without departing from the concept as intended by the current invention.

Within another embodiment, budgets are implemented by means of priority manipulations too. In-budget execution is performed at high priority, and out-of-budget execution is done at low priority. This gives rise to two main priority bands, a high-priority band (HP) for in-budget executions and a low-priority band (LP) for out-of-budget executions. An entity that consists of multiple tasks gives rise to a sub-priority band, so that tasks within the entity can be prioritised. Priority bands of entities are disjoint (i.e. they do not overlap). Budgets are periodic, and the budget periods may be different for each entity. The budget for entity $E_i$ is denoted by $<B_i, T_i>$, where $T_i$ is the budget period, and $B_i$ the budget period for $E_i$.

In HP, the entities are scheduled in rate-monotonic priority order, i.e. entities with smaller budget periods get higher priorities. At the start of each new period, the priority of an entity is raised to its rate-monotonic priority within HP. When the budget is exhausted, or when the entity releases the processor, the entity's priority is lowered to LP. In case of a multi-task entity, the complete sub-priority band is raised or lowered, leaving the internal priority ordering intact.

The admission test of the resource scheduler is based on rate monotonic analysis (RMA). Assume a set of entities $(E_1, E_2, \ldots E_n)$, with budgets $<B_1, T_1>, <B_2, T_2>, \ldots, <B_n, T_n>$. $E_i$'s priority in HP is denoted by $HP_i$. The priorities are rate monotonic, i.e. if $T_i<T_j$, then $HP_i>HP_j$. The admission test is passed, if for all entities $E_i$ a worst-case response time $R_i$ can be found that satisfies equations (1) and (2). Note that when the admission test is passed, all entities can consume their budget within their period.

$$R_i = B_i + \sum_{HP_j>HP_i} \lceil R_i/T_j \rceil \times B_j \qquad (1)$$

$$R_{i \leq Ti} \qquad (2)$$

It is assumed that there exists a set of three entities, UF, ¬UF, and a neutral entity N. The guaranteed budgets for these entities are $<B_{UF}, T_{UF}>$, $<B_{\neg UF}, T_{\neg UF}>$, and $<B_N, T_N>$, respectively, where $B_{UF}$ includes a budget margin $BM_{UF}$. In addition, ¬UF has a conditionally guaranteed budget $<CGB_{\neg UF}, T_{\neg UF}>$, which it will receive when the load of UF is consistently lower than $<B_{UF}-BM_{UF}, T_{UF}>$. When ¬UF has exhausted its guaranteed budget, its priority is not lowered to LP, but to MP. When ¬UF has exhausted its conditionally guaranteed budget, its priority is lowered to LP. If the next budget period starts before ¬UF has exhausted its conditionally guaranteed budget, the priority is raised to HP.

The additional admission test for the $CGB_{\neg UF}$ is passed, if a worst-case response time $CR_{\neg UF}$ can be found that satisfies equations (3) and (4).

$$CR_{\neg UF} = \qquad (3)$$
$$CGB_{\neg UF} + \sum_{j \neq UF} \lceil CR_{\neg UF}/T_j \rceil \times B_j + \lceil CR_{\neg UF}/T_{UF} \rceil \times (B_{UF} - BM_{UF})$$

$$CR_{\neg UF \leq T \neg UF} \qquad (4)$$

This can be generalized to entity sets with one UF entity, n ¬UF entities, and m neutral entities.

Figure 5:
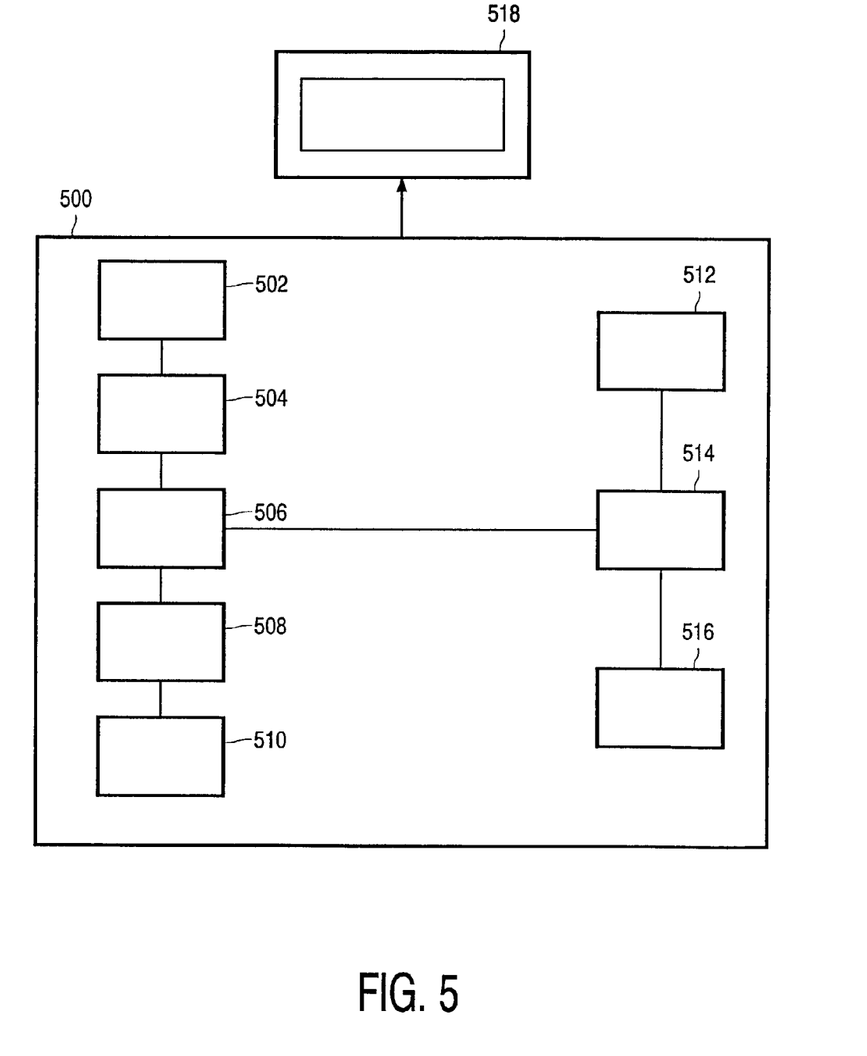
FIG. 5 illustrates the most important parts of an embodiment of the system according to the invention in a schematic way, FIG. 6 describes a television set in a schematic way that contains an embodiment of the system according to the invention, FIG. 7 describes a set-top box in a schematic way that contains an embodiment of the system according to the invention.

FIG. 5 illustrates the most important parts of an embodiment of the system according to the invention in a schematic way. The system, 500, comprises a determination memory, 502, programmed to contain rules that must be applied to determine the relative importance of a first and a second task. For example, one of the rules can be that a task that has a user focus is more important then an other task that has no user focus. When the first task has the user focus, then the first task is a more important task then the second task. An other requesting memory, 504, is programmed to contain both the requested more important requested budget of the more important task and the requested less important requested budget of the less important task. An allocation or assignment unit, 506, allocates a more important guaranteed budget to the more important task and it allocates a less important guaranteed budget to the less important task. Furthermore, this allocation or assignment unit is programmed to perform the admission control, as described above, before allocation. An other allocation memory, 508, contains a guaranteed budget margin that, in addition to, the more important guaranteed budget, forms a worst-case budget for the more important task. With this worst-case budget, the more important task is able to maintain a stable quality of service level during a load increase. The reserving memory, 510, contains a reserved conditionally guaranteed budget margin, that can be reserved for the less important task in case the more important task does not use its complete, or parts of its, guaranteed budget margin. A deriving allocation or assignment unit, 512, is used to derive the contents of the reserving memory, 510, from the contents of the allocation memory 508. A conditionally allocated memory, 514, contains an amount of the reserved conditionally guaranteed budget margin as contained in 510, that gets actually allocated to the less important task in case the more important task does not use its complete, or parts of its, guaranteed budget margin. A completion memory, 516, can contain a boolean variable which has an initial value of "false" and can be set to "true" when the more important task is completed. When the completion memory, 516, is set to "true", an amount of the reserved conditionally guaranteed budget margin as contained in 510, can be allocated to the less important task to enable operating the less important task at a high quality level. The amount of the reserved conditionally guaranteed budget gets stored into the conditionally allocated memory 514. When the less important task is not allocated the amount of the reserved conditionally guaranteed budget, because, for example, the complete guaranteed budget is used, the less important task can operate at a lower quality of service level. This system can be realized in software intended to be operated as an application by a computer or any other standard architecture able to operate software. The system can be used to operate a digital television set, 518.

Figure 6:
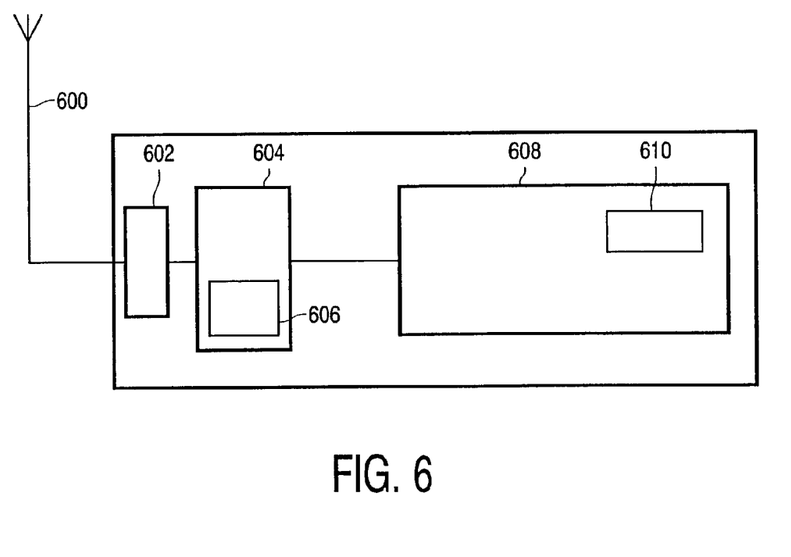

FIG. 6 illustrates, in a schematic way, the most important parts of a television set that comprises an embodiment of the system according to the invention. Here an antenna, 600 receives a television signal. The antenna may also be for example a satellite dish, cable or any other device able to receive a television signal. A receiver, 602 receives the signal. Besides the receiver 602, the television set contains a programmable component, 604, for example a programmable integrated circuit. This programmable component contains a system according to the invention 606. A television screen 608 shows images that are received by the receiver 602 and are processed by the programmable component 604, the system according to the invention 606 and other parts that are normally contained in a television set, but are not shown here. This television screen 608 can have a user focus. The picture in picture window 610 may not have the user focus.

Figure 7:
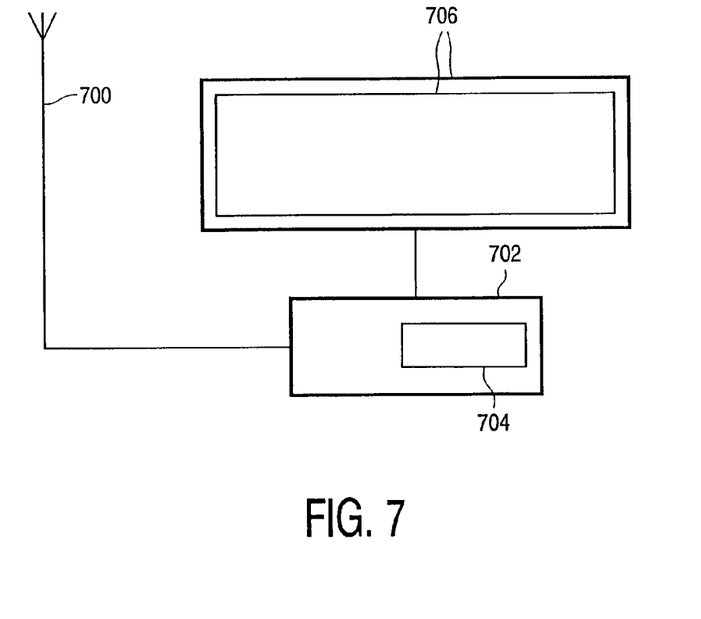

FIG. 7 illustrates, in a schematic way, the most important parts of a set-top box that comprises an embodiment of the system according to the invention. Here an antenna, 700 receives a television signal. The antenna may also be for example a satellite dish, cable or any other device able to receive a television signal. A set-top box 702, receives the signal. Besides the normal parts that are contained in a set-top box, but are not shown here, the set-top box contains a system according to the invention 704. The television set 706 can show the output signal generated by the set-top box 702 together with the system according to the invention 704 generate from a received signal.

The invention claimed is:

1. A method of scheduling, for use with a processing device, a first task and a second task comprising the steps of:
    determining that the first task is a more important task compared to the second task associating a requested budget with the more important task and a second requested budget with the less important task, and
    allocating a guaranteed budget to the more important task based upon the requested budget of the more important task and allocating a second guaranteed budget to the less important task based upon the second requested budget associated with the less important task,
    wherein the steps of allocating further comprises the steps of: allocating a guaranteed budget margin with the more important task in addition to the guaranteed budget, and reserving a conditionally guaranteed budget margin to the less important task in addition to the second guaranteed budget associated with the less important task.

2. A method according to claim 1, wherein the steps of allocating further comprises a step of:
    deriving the conditionally guaranteed budget margin from the guaranteed budget margin.

3. A method according to claim 1, further comprising a step of:
    signaling completion of the more important task.

4. A method according to claim 1, further comprising the steps of:
    operating the less important task at a first quality of service level when the less important guaranteed budget is available to the less important task, and
    operating the less important task at a second quality of service level when the conditionally guaranteed budget margin and the less important guaranteed budget are allocated available to the less important task.

5. A method according to claim 2, further comprising a step of:
    allocating an amount of the conditionally guaranteed budget margin to the less important task.

6. A system for scheduling a first task and a second task comprising:
    determination means conceived to determine that the first task is a more important task compared to the second task,
    requesting means conceived to contain a request for a requested budget by the first task and a second request for a budget by the second task,
    allocation means conceived to allocate a guaranteed budget based upon the requested budget of the first task and allocating a second guaranteed budget to the second task based upon the second requested budget of the second, wherein the allocation means comprises: guaranteeing means conceived to allocate a guaranteed budget margin for the first task in addition to the guaranteed budget of the first task, and
    reservation means conceived to reserve a conditionally budget margin to the second task in addition to the second guaranteed budget of the second task.

7. A system according to claim 6 wherein the allocation means further comprises:
    derivation means for deriving the conditionally guaranteed budget margin from the guaranteed budget margin.

8. A system according to claim 6, further comprising a completion memory for determining a completion signal of the first task.

9. A system according to claim 7, further comprising a memory for containing an amount of the conditionally guaranteed budget margin that can be allocated to the less important task.

10. A television set comprising:
    a system for scheduling a first task and a second task comprising: determination means conceived to determine that the first task is a more important task compared to the second task,
    requesting means conceived to contain a request for a requested budget by the first task and a second request for a budget by the second task,
    allocation means conceived to allocate a guaranteed budget to the more important task based upon the requested budget of the-first task and allocating a second guaranteed budget to second task based upon the second requested budget of the second, wherein the allocation means comprises: guaranteeing means conceived to allocate a guaranteed budget margin for the first task in addition to the guaranteed budget of the first task, and
    reservation means conceived to reserve a conditionally guaranteed budget margin to the second task in addition to the second guaranteed budget of the second task.

11. A set-top box comprising:

a system for scheduling a first task and a second task comprising:

determination means conceived to determine that the first task is a more important task compared to the second task, requesting means conceived to contain a request for a requested budget by the first task and a second request for a budget by the second task, allocation means conceived to allocate a guaranteed budget to the more important task based upon the requested budget of the-first task and allocating a second guaranteed budget to second task based upon the second requested budget of the second, wherein the allocation means comprises: guaranteeing means conceived to allocate a guaranteed budget margin for the first task in addition to the guaranteed budget of the first task, and reservation means conceived to reserve a conditionally guaranteed budget margin to the second task in addition to the second guaranteed budget of the second task.

* * * * *